Figure 1:
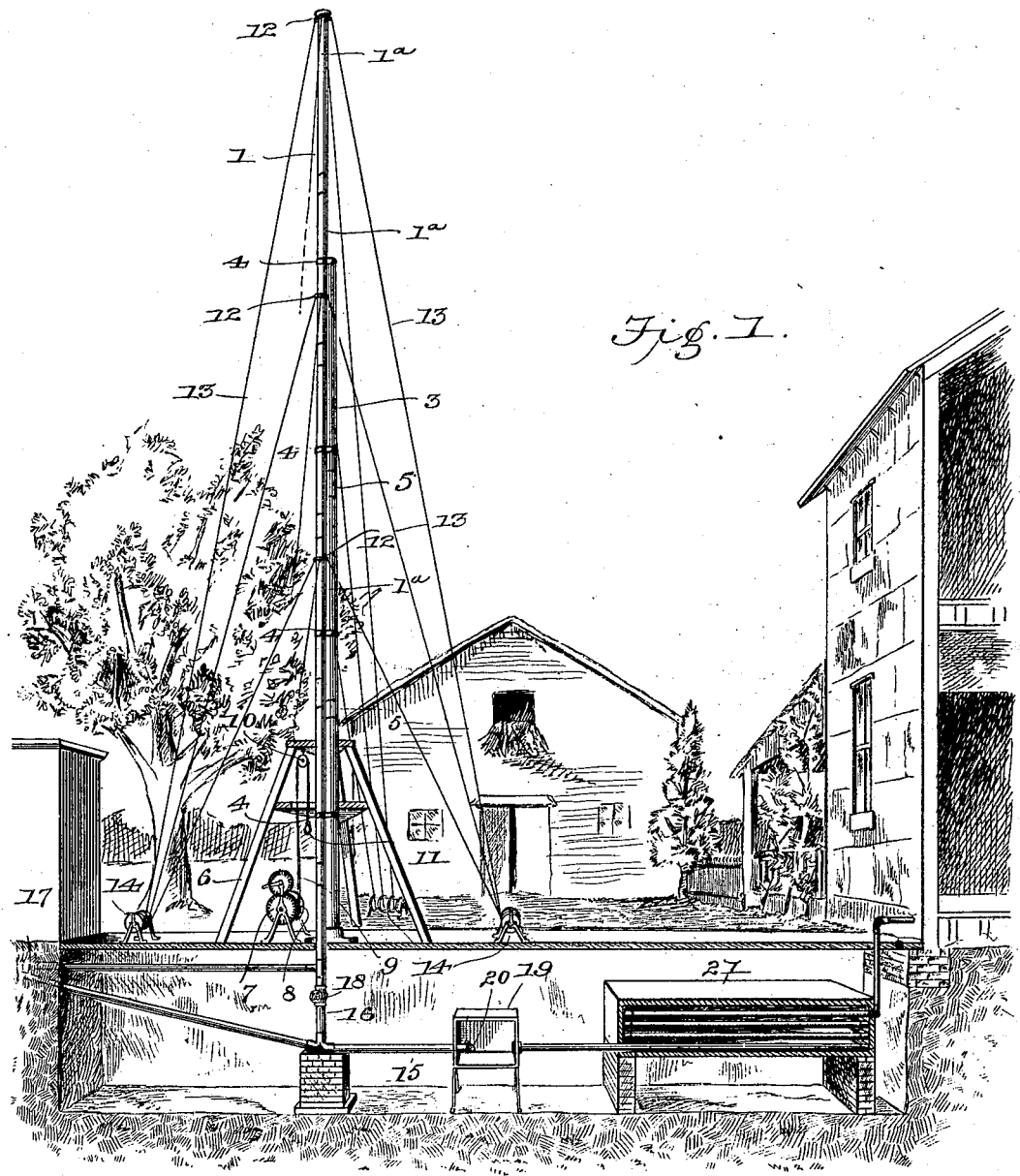

No. 670,443. Patented Mar. 26, 1901.
W. E. VERNON.
VENTILATING APPARATUS.
(Application filed Oct. 20, 1898.)
(No Model.) 2 Sheets—Sheet 1.

No. 670,443. Patented Mar. 26, 1901.
W. E. VERNON.
VENTILATING APPARATUS.
(Application filed Oct. 20, 1898.)
(No Model.) 2 Sheets—Sheet 2.
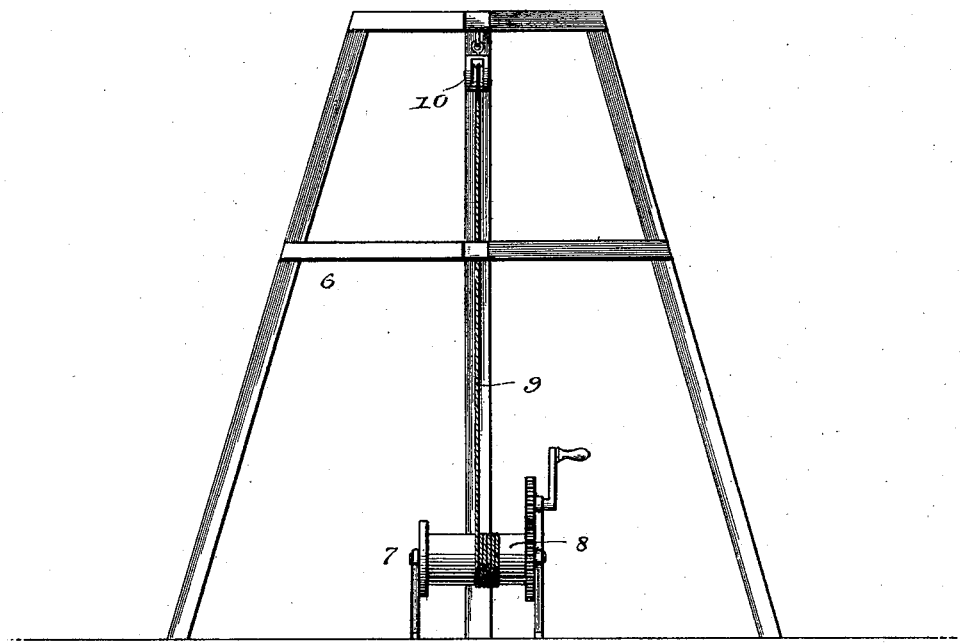
Fig. 2
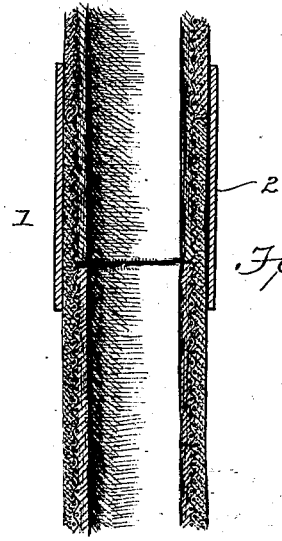
Fig. 4. Fig. 3.
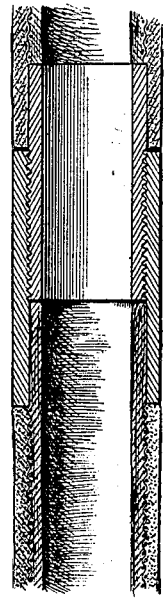
Witnesses William E. Vernon Inventor
E. N. Monroe By his Attorneys,
C. A. Snow & Co.

UNITED STATES PATENT OFFICE.

WILLIAM E. VERNON, OF SAN ANGELO, TEXAS.

VENTILATING APPARATUS.

SPECIFICATION forming part of Letters Patent No. 670,443, dated March 26, 1901.

Application filed October 20, 1898. Serial No. 694,123. (No model.)

*To all whom it may concern:*

Be it known that I, WILLIAM E. VERNON, a citizen of the United States, residing at San Angelo, in the county of Tom Green and State of Texas, have invented a new and useful Ventilating Apparatus, of which the following is a specification.

My invention relates to ventilating apparatus, and particularly to a device adapted for use in connection with buildings, storehouses, and school and other buildings, both public and private; and it consists in the construction and arrangement of the several parts, which will be more fully hereinafter described and claimed.

In the drawings, Figure 1 is a perspective view of a ventilating apparatus constructed in accordance with my invention. Fig. 2 is a detail view showing the hoisting devices used in connection with the ventilating pipe or shaft. Fig. 3 is a detail view, partly in section, of one of the sections of the pipe or shaft. Fig. 4 is a similar view of a section of a ventilating pipe or shaft, showing a different construction of coupling.

Similar numerals of reference indicate corresponding parts in all the figures of the drawings.

In the construction illustrated the pipe or shaft 1, which constitutes the conveyer for air, consists of detachable sections united by suitable couplings corresponding in size, whereby the sections are interchangeable. In practice I prefer to provide each section at one end with an internally-threaded socket for the reception of the contiguous threaded extremity of the adjoining section. This coupling, however, is particularly adapted for pipe-sections of metal or the equivalent thereof, and when said sections are made of lighter material, as hereinafter described, an ordinary sleeve-coupling 2, such as that shown in Fig. 4, may be employed. Also in connection with the pipe or shaft may be employed a standard 3, provided at intervals with guide rings or sleeves 4, through which the pipe or shaft extends, such standard in the construction illustrated also being sectional, with its members connected by suitable couplings 5. In connection with the pipe or shaft is a frame or derrick 6, carrying a windlass 7, which includes a drum 8, and reeled upon this drum is an elevating-cable 9, extending over a guide pulley or sheave 10 and terminating in the clutch 11, adapted for engagement successively with the sections of the pipe or shaft as the latter is elevated. It will be understood that I desire to employ a pipe or shaft of even diameter throughout, and hence in extending the air-conveyer the sections thereof must be added successively, the first one being elevated by the engagement of the clutch 11 therewith and the reeling of the cable upon the drum 8, the next section being attached to the first and the elevating process repeated until the lower extremity of the last-named section has reached an elevation sufficient to allow the application of a third section, and so on throughout the operation. At suitable intervals, however, I prefer to introduce pipe-sections 1ª, which are provided with flanges or rings 12, to which are attached guy wires or cables 13, said sections 1ª being identical in construction with the other sections of the pipe, with the exception of said flanges or rings, and being adapted to be introduced at different intervals to suit the conditions under which the ventilating apparatus is to be used or the strains to which the same will be subjected while in position. Said guy wires or cables extend from the flanges or rings 12 to suitable windlasses 14, arranged at suitable intervals around the shaft, whereby when the shaft has been extended to the desired height the strain of the windlasses will tighten the guy wires or cables, and thus firmly brace the structure. Obviously during the erection of the shaft these windlasses 14 are allowed to turn freely to unwind the guy wires or cables carried thereby.

The pipe or shaft 1 communicates with the conveyer 15 both directly, as shown at 16, and indirectly through an air compressor or reservoir 17, a suitable valve 18 being employed in the direct connection 16 to cut off such direct communication and cause the air introduced through the pipe or shaft to pass into the compressor or reservoir 17 before finding its way into the conveyer 15. The conveyer 15 is separated, and the terminals of the separated portions are connected to the opposite ends of a valve-chamber 19 in box form and having supporting-legs, one of the separated ends of the conveyer having a check-valve 20 for preventing back pressure into the said conveyer, and hence interfering with the downdraft of air through the pipe or shaft 1, and said conveyer 15 also continues into an inclosed tempering-coil 21, adapted to be heated or cooled, as may be preferred, to produce the desired temperature of the air before it is discharged into the building.

By reason of the use of the check-valve 20, which prevents back pressure into the pipe or shaft 1, and particularly by the use of the tempering-coil 21, I have found in practice that a steady current of air is introduced downwardly through the pipe or shaft 1 and into the building to be ventilated, whereby all of the air required in the building may be supplied through the apparatus to enable the building otherwise to be constructed practically air-tight, and it will be understood, furthermore, that the object in view in thus supplying a building with air is to obtain air at an elevation where it is uncontaminated. In order to insure this down-current of air through the pipe or shaft, however, it is necessary to guard against the heating of the conveyer, either by the sun's rays or otherwise, in order that the cool air at the inlet end of the pipe or shaft may descend without opposition. To accomplish this, I have found it desirable to provide the pipe or shaft with a heat-non-conducting sheath or covering or, as preferable, to construct said pipe or shaft of heat-non-conducting material. Hence in practice I employ a pipe or shaft of layers of paper 22 and asbestos cloth 23 or the equivalents thereof, with an interposed or incorporated stiffening-layer 24 of wire-cloth or the equivalent thereof. This construction of pipe is also advantageous by reason of its lightness, and hence the facility with which it may be extended to the desired elevation. As hereinbefore indicated, however, the sections of the pipe or shaft when constructed of this light material, such as paper and asbestos cloth, may be united by sleeve-couplings, as shown in Fig. 4. Also the vertical support or standard 3, which I have illustrated in connection with the improved apparatus, is particularly adapted for use when the pipe or shaft is of the light materials named in order to maintain the same in the desired position; but when the pipe or shaft is constructed of more rigid materials, as of metal, it is obvious that this standard may be omitted.

Various changes in the form, proportion, and minor details of construction may be made without departing from the spirit or sacrificing any of the advantages of the invention.

Having described the invention, what I claim is—

1. A ventilating apparatus for buildings, comprising a vertical adjustable pipe or shaft having its inlet end located at an elevated point exterior of the building to be ventilated, a horizontal conveyer attached to the lower extremity of said pipe or shaft and having portions projecting in opposite directions therefrom, one portion of the said conveyer being intermediately interrupted or severed, an enlarged valve-chamber to opposite ends of which the severed portions of the said conveyer are connected and forming an intermediate support for the latter, one of said severed portions being controlled by a check-valve which is located in the chamber to prevent back pressure into the conveyer, and a tempering device surrounding and inclosing a coiled portion of the conveyer and located between the valve-chamber and the building to which it leads.

2. A ventilating apparatus, comprising a vertical adjustable sectional pipe or shaft supported exteriorly of the building to be ventilated and having its inlet end located at an elevated point, a valve in the lower extremity of the pipe or shaft, a pipe attached to the said pipe or shaft and running to a pressure mechanism, said pipe being attached above the location of the valve, a horizontal conveyer secured to the lower terminal of the vertical pipe or shaft below the valve and extending in opposite directions, one portion of the conveyer being attached to the pressure mechanism and the other portion thereof intermediately divided and separated, a valve-chamber having the divided portions of the conveyer connected to the opposite ends thereof and supplied with a check-valve, said valve-chamber having legs and supporting the conveyer, and a tempering device through which a coiled portion of the conveyer runs and located between the valve-chamber and the building to which the conveyer leads.

In testimony that I claim the foregoing as my own I have hereto affixed my signature in the presence of two witnesses.

WILLIAM E. VERNON.

Witnesses:
A. W. ARMSTRONG,
FRED S. WEBB.